March 8, 1927.
B. SCHADE
1,620,040
VISIBLE REGISTERING DEVICE FOR CAMERAS
Filed Jan. 21, 1921
2 Sheets-Sheet 1
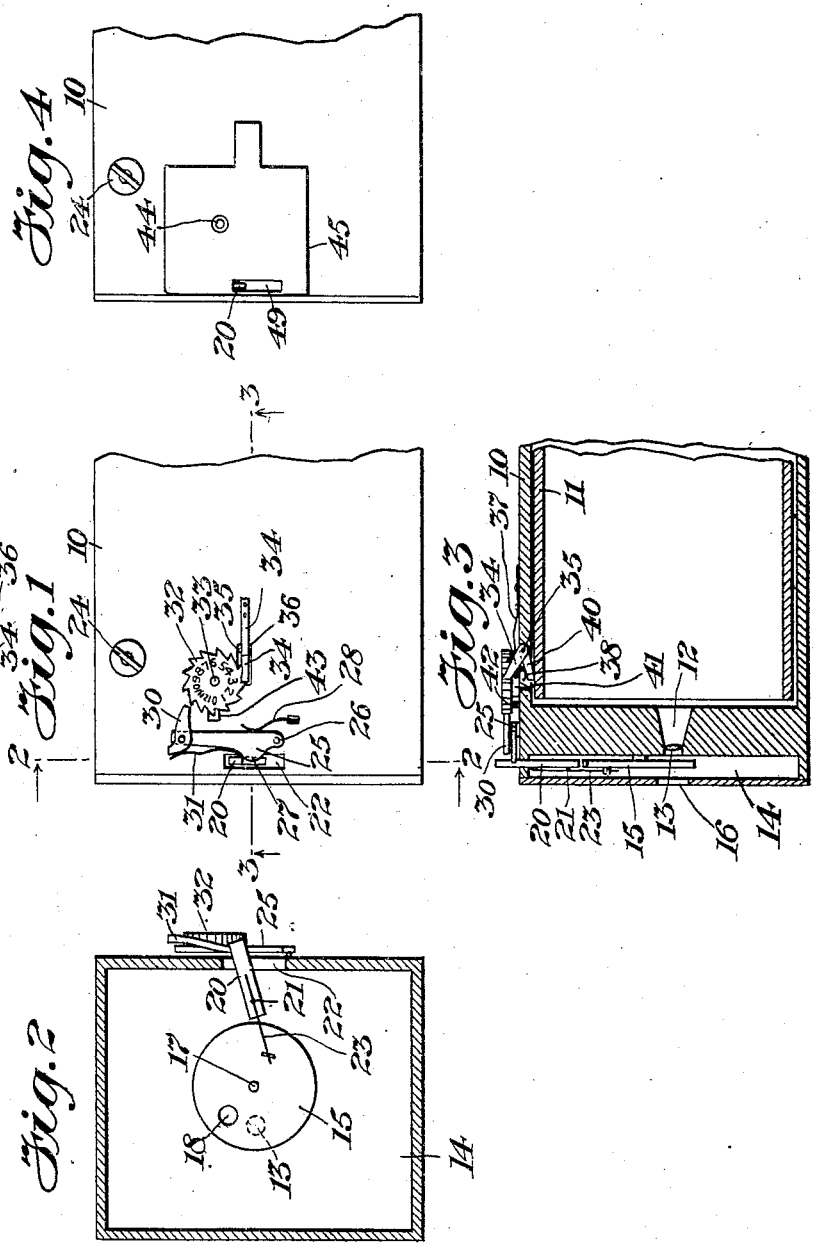
INVENTOR.
Blanche Schade
BY
A. I. Gardner
HER ATTORNEY March 8, 1927. 1,620,040
B. SCHADE
VISIBLE REGISTERING DEVICE FOR CAMERAS
Filed Jan. 21, 1921  2 Sheets-Sheet 2
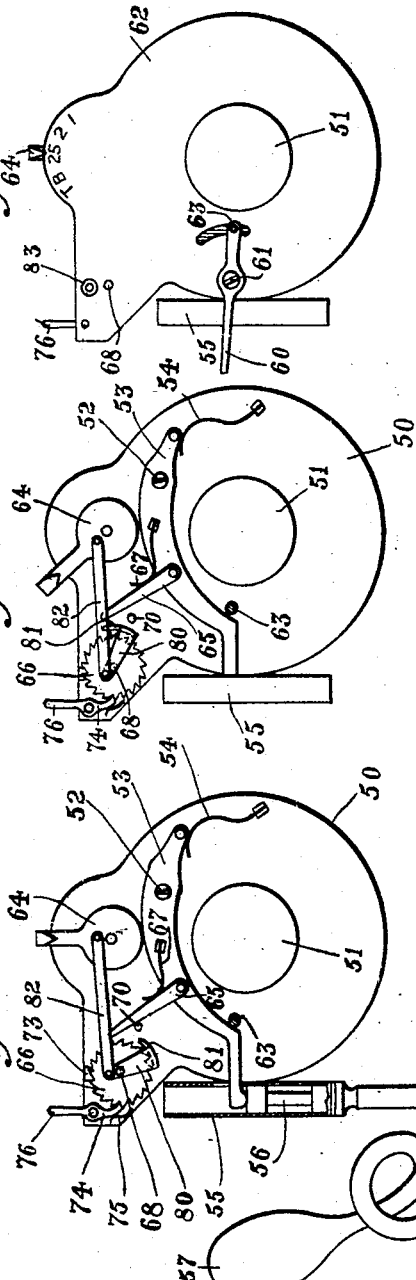
INVENTOR.
Blanche Schade
BY A. J. Gardner
HER ATTORNEY Patented Mar. 8, 1927.

1,620,040

UNITED STATES PATENT OFFICE.

BLANCHE SCHADE, OF GLOUCESTER, MASSACHUSETTS.

VISIBLE REGISTERING DEVICE FOR CAMERAS.

Application filed January 21, 1921. Serial No. 438,955.

Some of the objects of the present invention are to provide a means for indicating the number of exposures the shutter of a camera has made; to provide means for reducing the chance of making two different exposures upon the same length of light sensitive material; to provide means for successively indicating in a visible manner the number of exposures made by a camera shutter; to provide exposure registering means operating with both instantaneous and time exposures of a camera shutter; and to provide other improvements as will hereinafter appear.

In the accompanying drawings, Fig. 1 represents a plan of the top of a camera equipped with one form of the present invention; Fig. 2 represents a front elevation of the same; Fig. 3 represents a section on line 2—2 of Fig. 1; Fig. 4 is a plan of the camera with the main parts of the invention concealed; Fig. 5 represents an enlarged detail of the ratchet mechanism shown in Fig. 1; Fig. 6 represents a front elevation of another form of the invention arranged in conjunction with a different type of shutter mechanism; Fig. 7 represents a similar elevation with the parts in a different position; Fig. 8 represents a front elevation with the shutter cover plate in position; Fig. 9 represents a plan of the mechanism shown in Fig. 6; and Fig. 10 represents an enlarged detail of the ratchet mechanism of the form of the invention shown in Fig. 6.

Referring to the drawings, one form of the present invention is shown as applied, by way of example, to a Brownie camera of well known construction comprising a box 10 arranged to receive a receptacle 11 for a film or other light sensitive material in telescopic relation. The receptacle 11 has an open end disposed toward the front of the box 10 where an opening 12 having a lens 13 therein is arranged to project images within the receptacle 11. This front portion of the box 10 is provided with a compartment 14 in which a disc shutter 15 is located and arranged to normally cut off light from an opening 16 to the lens 13. The shutter 15 is pivoted at 17 and has an opening 18 therethrough which is arranged to register periodically with the opening 16 to thereby admit light rays to the lens 13, thus exposing the light sensitive material, such as a film or plate for picture taking purposes. The shutter 15 is operated by a lever 20 which is pivoted at 21 and has its free end extending through a slot 22 in the box 10 where it is accessible for operation. The lever 20 carries a spring member 23 which is secured to the shutter 15 so that movement of the lever 20, from one side to the other, causes the shutter 15 to be rapidly thrown across the path of the light rays from the opening 16. A thumb piece 24 is provided for turning the winding spool for the film in the usual manner.

For the purpose of registering the number of operations of the shutter 15, an arm 25 is pivoted at 26 to the box 10 in relatively close proximity to the projecting end of the lever 20, said arm 25 having a cam projection 27 which is laterally disposed in the path of movement of the lever 20. A spring 28 is arranged to hold the arm 25 in normal position so that the lever 20 engages the projection 27 when moved. The arm 25 carries a pivoted pawl 30 pressed by a spring 31 in a manner to engage a thirteen tooth ratchet wheel 32 which is fixed to a spindle 33 rotatably mounted on the box 10, and arranged to be held in any set position by a pawl 34 pivoted at 35 in a slot 36 in the box 10. The pawl 34 is normally subject to the downward pressure of a spring 37, and is also subject to the upward pressure of a spring 38 which is interposed between the pawl 34 and a detent 40. The detent 40 is connected to the same pivot 35 and normally rests upon the top of the receptacle 11, thereby holding the pawl 34 in ratchet engaging position.

In order to set the ratchet-wheel 32 to zero, a coiled spring 41 is provided fastened at one end to the box 10 and at the other end to the spindle 33. On the lower surface of the ratchet-wheel 32 is secured a pin 42 which cooperates with a stop 43 fixed to the top of the box 10 in a position to locate the ratchet-wheel 32 at zero when the pawl 34 is removed from engagement with the ratchet teeth. The upper face of the ratchet-wheel 32 is provided with a series of consecutive numbers corresponding to the number of pictures to be taken by a film roll. As here shown there are twelve such members all arranged to pass successively across a sight opening 44 in the top of the box 10. A suitable cover plate 45 is provided for the top of the box 10.

In the operation of this form of the invention (Figs. 1 to 5 inclusive) the shutter 15 is operated by moving the lever 20 from one side to the other in a well known manner. After the camera has been loaded with a film roll, the thumb-piece 24 is rotated until the first film is in position, as shown by the number on the film as seen through the opening in the rear of the camera. When it is desired to take the first picture, the lever 20 is moved in the required direction to operate the shutter 15 and thereby engages the cam projection 27 thus causing the arm 25 to swing in a clockwise direction so that its pawl 30 engages one of the teeth of the ratchet wheel 32 and turns the ratchet wheel 32 through one thirteenth of a revolution. When the lever 20 has moved its full stroke it has passed the projection 27 and consequently the spring 28 returns the arm 25 to its initial position. The ratchet wheel 32, however, is held in the new position by the pawl 34 and the numeral 1 appears in the opening 44, thus giving visual indication that film number one has been exposed. The thumb-piece 24 is now turned to bring the second film into position. When it is desired to take another picture, the lever 20 is shifted back to its former position, thereby actuating the shutter 15 and also engaging the projection 27 to shift the arm 25 and thus again turn the ratchet-wheel 32 through one thirteenth of a revolution, as previously described, to bring number (2) in the opening 44, thus apprising the operator that the second film has been exposed. This continues until the whole number of twelve films has been exposed, thus bringing the number (12) in the opening 44. The operator then knows that it is time to reload the camera and therefore removes the receptacle 11 to take out the exposed film. When the receptacle 11 is removed the pawl 34 and the detent 40 are turned by the spring 37 to remove the pawl 34 from engagement with the ratchet wheel 32, whereupon the latter returns to its zero position by the action of the coil spring 41 and the zero figure appears in the opening 44. After a new film has been put in, the receptacle 11 is replaced in the box 10, thereby engaging the detent 40 and causing the pawl 34 to assume its operative position. The mechanism is then ready to repeat the cycle of operations as described.

In the form of the invention shown in Figures 6 to 10 inclusive, the mechanism is arranged for use with a time controlled shutter wherein a frame 50 of a camera is arranged to receive a shutter 51 and its associated parts as is well understood. The shutter 51 is pivoted at 52 to the frame 50 and is operated by a lever 53 which is held in the position shown by means of a spring 54. The other end of the lever 53 extends into a cylinder 55 which is provided with a piston 56 operated by a bulb 57 in a well known manner.

For manual operation of the shutter 51 there is a hand lever 60 pivoted at 61 to the front cover plate 62 and having a pin 63 which cooperates with the lever 53 so that when the lever 60 is depressed and released it operates the shutter 51. A time control member 64 is pivoted to the camera frame 50 and controls the timing mechanism of the shutter 51 as will be understood, giving exposures of fractions of a second, time exposures and exposures by the bulb 57, all being of standard construction.

As a means for actuating the registering mechanism, the lever 53 carries a pivoted pawl 65 which is normally held in operative relation to a twenty-six tooth ratchet-wheel 66 by a spring 67. The ratchet-wheel 66 is rigidly secured to a rotatable spindle 68, mounted in bearings respectively in the frame 50 and front plate 62, and is arranged to be given a step by step movement by the operation of the pawl 65. A stop 70 is secured to the frame 50 to hold the pawl 65 out of engagement with the ratchet-wheel 66, but in position to engage therewith when actuated by a movement of the lever 53. The face of the ratchet-wheel 66 is provided with indicia, such as numerals, those here shown running consecutively from zero to twelve and arranged respectively opposite every other ratchet tooth.

For returning and setting the ratchet-wheel 66 to zero, a spiral spring 71 is provided, the same being connected at one end to the spindle 68 and at the other end to the frame 50. A pin 72 projects from the lower side of the ratchet-wheel 66 and is arranged to engage a stop 73 fixed to the frame 50, so that the ratchet-wheel 66 comes to rest, under the action of the spring 71, in zero position. A stop pawl 74 is also pivoted to the frame 50 and is held in engagement with the ratchet-wheel 66 by a spring 75 to prevent improper reverse movement. An extension 76 projects from the pawl 74 whereby it may be manually shifted to release the ratchet wheel 66 at certain times.

In order to place the ratchet-wheel 66 under control of the time mechanism, a finger 80 is loosely mounted on the spindle 68 and has on one end an extension plate or shield 81 which covers certain of the ratchet teeth. The other end of the finger 80 is connected by a link 82 with the member 64.

An opening 83 is provided in the front plate 62 with which the ratchet indicia are arranged to register in succession and are visible therethrough.

In the operation of this form of the invention, the mechanism is set as shown in Fig. 6 and a film in the camera is turned so that film number one is in position. When it is desired to take a picture, either the bulb 57 is compressed or the hand lever 60 is depressed, thus turning the lever 53 in a clockwise direction. This causes the pawl 65 to move into engagement with and rotate the ratchet-wheel 66 through a distance of one-thirteenth of a revolution or two ratchet teeth. When the lever 53 has assumed its initial position under the action of the spring 54, the pawl 65 also returns to its initial position but the ratchet-wheel 66 remains in its new position under the action of the pawl 74. This causes the numeral (1) to appear in the opening 83 to apprise the operator that film number (1) has been exposed. The film is therefore turned to bring the second film into position and when it is again desired to take a picture the foregoing operation is repeated and the ratchet-wheel 66 brings numeral (2) into register with the sight opening 83.

In case it is desired to take a time exposure the member 64 is moved to position as shown in Fig. 7, thereby causing the finger 80 to turn counter-clockwise and bring the shield 81 between the ratchet teeth and the pawl 65. When the bulb 57 is compressed or the lever 60 is depressed the pawl 65 will be moved by the lever 53 and pass over the first ratchet tooth to engage the next tooth, whereby the ratchet-wheel is turned through one twenty-sixth of a revolution, or one tooth instead of two. The shutter 51 now being open, it is necessary to compress the bulb 57 or depress the lever 60 to close the shutter. When this is done the operation just described will be repeated and the ratchet-wheel 66 will again be turned through a twenty-sixth of a revolution or one tooth, thus bringing number (3) into register with the sight opening 83, thus indicating that the third film has been exposed. These operations, which have justed been described, are continued until the entire roll of films has been exposed, when the number (12) will appear in the sight opening 83. The operator therefore removes the roll of films and replaces it with a new roll, at the same time shifting the extension 76 in a direction to release the pawl 74 whereupon the ratchet-wheel 66 returns to its zero position under the action of the spring 71 with the pin 72 abutting the stop 73.

While but two of the many forms in which this invention may be embodied are here shown, it is to be understood that the invention is not limited to any specific construction, but might be applied in various forms without departing from the spirit of the invention or the scope of the appended claims.

Having thus described my invention, I claim:

1. In a camera having a shutter and means for operating the shutter, a cover member having a side opening, a device provided with indicia and means selectively operable upon the operation of the shutter for moving said device either one or more steps according to the character of exposure being made, said device being arranged to bring successive indicia into register with said side opening upon the movement of the device through two steps.

2. In a camera, having a shutter, and a shutter operating means, an indicating member arranged to be operated by said shutter operating means, and means for moving said indicating means a predetermined amount upon either one or two actuations of the shutter operating means, according to the character of exposures to be made by said shutter.

3. In a camera having a shutter and manually controlled means for operating the shutter and means for modifying the action of said shutter operating means, a movable member provided with consecutively arranged indicia, means controlled by said shutter operating means for imparting a step by step movement to said movable member, and means controlled by the shutter operating modifying means for selectively causing different degrees of movement of said movable member.

Signed at Gloucester, in the county of Essex, and State of Massachusetts, this seventh day of January, 1921.

BLANCHE SCHADE.